US008559946B2

United States Patent
Xu et al.

(10) Patent No.: US 8,559,946 B2
(45) Date of Patent: Oct. 15, 2013

(54) DISCONTINUOUS TRANSMISSION SIGNALING OVER AN UPLINK CONTROL CHANNEL

(75) Inventors: Hao Xu, San Diego, CA (US); Juan Montojo, San Diego, CA (US); Durga Prasad Malladi, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 789 days.

(21) Appl. No.: 12/365,872

(22) Filed: Feb. 4, 2009

(65) Prior Publication Data

US 2009/0221289 A1    Sep. 3, 2009

Related U.S. Application Data

(60) Provisional application No. 61/027,254, filed on Feb. 8, 2008, provisional application No. 61/039,548, filed on Mar. 26, 2008.

(51) Int. Cl.
*H04W 4/00* (2009.01)
*H04L 27/28* (2006.01)

(52) U.S. Cl.
USPC ............................................ 455/434; 375/260

(58) Field of Classification Search
USPC ............ 455/434, 115.3, 115.4, 226.1, 226.2, 455/226.3, 226.4, 161.1, 161.2; 375/260
See application file for complete search history.

(56) References Cited

U.S. PATENT DOCUMENTS

| 7,352,722 B2 | 4/2008 | Malladi et al. |
| 7,957,317 B2 * | 6/2011 | Frederiksen et al. ......... 370/252 |
| 2003/0185159 A1 | 10/2003 | Seo et al. |
| 2004/0202147 A1 | 10/2004 | Hakkinen et al. |

(Continued)

FOREIGN PATENT DOCUMENTS

| JP | 2007180926 A | 7/2007 |
| RU | 2210866 C2 | 8/2003 |

(Continued)

OTHER PUBLICATIONS

"Embedding ACK/NAK in CQI Reference Signals and Receiver Structures", 3GPP TSG RAN WG1 #51bis, R1-080190, Sevilla, Spain, Jan. 14-18, 2008.

(Continued)

*Primary Examiner* — Kent Chang
*Assistant Examiner* — Scott Au
(74) *Attorney, Agent, or Firm* — Nerrie M. Zohn

(57) ABSTRACT

Systems and methodologies are described that facilitate signaling and detecting discontinuous transmission (DTX) in a wireless communication environment. A DTX indicator and Channel Quality Indicator (CQI) feedback can be multiplexed within a common uplink control channel subframe and transmitted to a base station when the access terminal is operating in DTX mode for an Acknowledgement Channel. Further, when operating in non-DTX mode, the access terminal can multiplex an ACK indicator or a NAK indicator with the CQI feedback within a common uplink control channel subframe, which can thereafter be transferred to the base station. Accordingly, the base station can detect DTX operation or non-DTX operation of the access terminal. For example, reference signal symbols can carry one of the DTX indicator, the ACK indicator, or the NAK indicator. Pursuant to another example, the CQI feedback and the DTX indicator can be combined and carried jointly by non-reference signal symbols.

28 Claims, 12 Drawing Sheets

(56) References Cited

U.S. PATENT DOCUMENTS

| | | | |
|---|---|---|---|
| 2005/0181811 A1* | 8/2005 | Magnusson et al. | 455/458 |
| 2008/0194283 A1* | 8/2008 | Chaponniere | 455/522 |
| 2010/0172373 A1 | 7/2010 | Kimura et al. | |

FOREIGN PATENT DOCUMENTS

| | | |
|---|---|---|
| RU | 2242095 C2 | 12/2004 |
| WO | WO2006020283 A2 | 2/2006 |
| WO | 2007135777 A1 | 11/2007 |
| WO | WO2009028095 A1 | 3/2009 |

OTHER PUBLICATIONS

"On the design of CQI coding in PUCCH", 3GPP TSG RAN WG1 #51bis, R1-080548, Sevilla, Spain, Jan. 14-18, 2008.

"ACK/NAK and CQI Multiplexing in the PUCCH", 3GPP TSG RAN WG1 #51bis, R1-080033, Sevilla, Spain, Jan. 14-18, 2008.

Alcatel-Lucent "Multiplexing the Scheduling Request in the Uplink" 3GPP Draft; R1-074276_Mux_SRS, 20071002 3rd Generation Partnership Project (3GPP), Mobile Competence Centre ; 650, route des Lucioles ; F-06921 Sophia-Antipolis Cedex ; France ,vol. RAN WG1, Nr:Shanghai, China; 20071002, XP050107795.

Nokia Siemens Networks Nokia: "Multiplexing of Scheduling Request with ACK/NACK and/or CQI", 3GPP Draft; R1-080312, 20080108 3rd Generation Partnership Project (3GPP), Mobile Competence Centre ; 650, route des Lucioles ; F-06921 Sophia-Antipolis Cedex ; France, vol. RAN WG1,Nr:Sevilla, Spain; 20080108, XP050108833.

Philips; Nokia "Correction of DTX transmission in ACK/NACK field",3GPP Draft; R1-02-1422 CR25214-295r2, 20021108 3rd Generation Partnership Project (3GPP), Mobile Competence Centre ; 650, route des Lucioles ; F-06921 Sophia-Antipolis Cedex ; France vol. RAN WG1, Nr:Shanghai, China; 20021108, XP050097112.

RAN WG1: "Reply LS on CQI feedback", 3GPP Draft; R1-072639, 20070524 3rd Generation Partnership Project (3GPP), Mobile Competence Centre ; 650, route des Lucioles ; F-06921 Sophia-Antipolis Cedex ; France, vol. RAN WG1,Nr:Kobe, Japan; 20070524, XP050106322.

International Search Report and Written Opinion—PCT/US2009/033221—ISA/EPO—Nov. 18, 2009.

3GPP TSG RAN WG1 Meeting #50 R1-073653, Nokia Siemens Networks, Nokia, Detection and DTX Performance of CQI+ACK/NACK transmitted on PUCCH, Aug. 24, 2007, URL,http://ftp.3gpp.org/tsg_ran/WG1_RL1/TSGR1_50/Docs/R1-073653.zip.

3GPP TSG-RAN WG1#51b R1-080191, Texas Instruments,Joint ACK/NAK and CQI Transmission in Long CP Structure[online], <URL: http://www.3gpp.org/ftp/tsg_ran/WG1_RL1/TSGR1_51b/Docs/R1-080191.zip>, Jan. 2008.

* cited by examiner

DISCONTINUOUS TRANSMISSION SIGNALING OVER AN UPLINK CONTROL CHANNEL

CROSS-REFERENCE TO RELATED APPLICATIONS

This application claims the benefit of U.S. Provisional Patent Application Ser. No. 61/027,254 entitled "DTX ENCODING IN LTE UPLINK CONTROL" which was filed Feb. 8, 2008 and U.S. Provisional Patent Application Ser. No. 61/039,548 entitled "DTX ENCODING IN LTE UPLINK CONTROL" which was filed Mar. 26, 2008. The entirety of the aforementioned applications is herein incorporated by reference.

BACKGROUND

I. Field

The following description relates generally to wireless communications, and more particularly to signaling discontinuous transmission (DTX) via an uplink control channel in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, ... ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

An access terminal can evaluate quality of a wireless communication channel. For instance, the access terminal can yield a measure of channel quality such as a Channel Quality Indicator (CQI), which can be reported to a base station via an uplink channel. Moreover, information can be sent from the base station via a downlink control channel and/or a downlink data channel intended for the access terminal. The access terminal can affirm or deny detection of information transferred over the downlink data channel by sending an Acknowledge character (ACK) or a Negative-Acknowledge character (NAK) to the base station. Oftentimes, CQI information and ACK/NAK information can be multiplexed in a common uplink control channel subframe by the access terminal. Conventional techniques where CQI information and ACK/NAK information is multiplexed in the same uplink control channel subframe, however, typically fail to allow the access terminal to distinguish between errors decoding information sent over the downlink data channel versus information sent over the downlink control channel when reporting to the base station. Accordingly, the base station can be unable to identify whether the access terminal failed to decode information transferred via the downlink data channel and/or information transmitted via the downlink control channel.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating signaling and detection of discontinuous transmission (DTX) in a wireless communication environment. A DTX indicator and Channel Quality Indicator (CQI) feedback can be multiplexed within a common uplink control channel subframe and transmitted to a base station when the access terminal is operating in DTX mode for an Acknowledgement (ACK) Channel. Further, when operating in non-DTX mode, the access terminal can multiplex an ACK indicator or a NAK indicator with the CQI feedback within a common uplink control channel subframe, which can thereafter be transferred to the base station. Accordingly, the base station can detect DTX operation or non-DTX operation of the access terminal. According to an example, reference signal symbols can carry one of the DTX indicator, the ACK indicator, or the NAK indicator. Pursuant to another example, the CQI feedback and the DTX indicator can be combined and carried jointly by non-reference signal symbols.

According to related aspects, a method that facilitates signaling discontinuous transmission (DTX) to a base station in a wireless communication environment is described herein.

The method can include encoding Channel Quality Indicator (CQI) information and a DTX indicator within an uplink control channel subframe corresponding to a downlink control channel when the downlink control channel is determined to have been unsuccessfully decoded. Further, the method can include transmitting the encoded uplink control channel subframe to a base station.

Another aspect relates to a wireless communications apparatus. The wireless communications apparatus can include a memory that retains instructions related to encoding Channel Quality Indicator (CQI) information and a discontinuous transmission (DTX) indicator within an uplink control channel subframe corresponding to a downlink control channel when the downlink control channel is determined to have been unsuccessfully decoded, encoding the CQI information and one of an Acknowledge character (ACK) indicator or a Negative-Acknowledge character (NAK) indicator within the uplink control channel subframe corresponding to the downlink control channel when the downlink control channel is determined to have been successfully decoded, and sending the encoded uplink control channel subframe to a base station. Further, the wireless communications apparatus can include a processor, coupled to the memory, configured to execute the instructions retained in the memory.

Yet another aspect relates to a wireless communications apparatus that enables signaling discontinuous transmission (DTX) with Channel Quality Indicator (CQI) information to a base station in a wireless communication environment. The wireless communications apparatus can include means for encoding an uplink control channel subframe to include CQI information with at least one indicator that distinguishes between successful decoding of a downlink control channel and a downlink data channel, failed decoding of the downlink control channel, and failed decoding of the downlink data channel. Moreover, the wireless communications apparatus can include means for transmitting the uplink control channel subframe to a base station.

Still another aspect relates to a computer program product that can comprise a computer-readable medium. The computer-readable medium can include code for encoding an uplink control channel subframe to include Channel Quality Indicator (CQI) information with at least one indicator that distinguishes between successful decoding of a downlink control channel and a downlink data channel, failed decoding of the downlink control channel, and failed decoding of the downlink data channel. Further, the computer-readable medium can comprise code for transferring the uplink control channel subframe to a base station.

In accordance with another aspect, an apparatus in a wireless communication system can include a processor, wherein the processor can be configured to determine whether a downlink control channel is successfully decoded by recognizing whether an assignment corresponding to an uplink control channel sent via the downlink control channel is received and decoded. Further, the processor can be configured to encode Channel Quality Indicator (CQI) information and a DTX indicator within an uplink control channel subframe corresponding to the downlink control channel when the downlink control channel is determined to have been unsuccessfully decoded. Moreover, the processor can be configured to encode the CQI information and one of an Acknowledge character (ACK) indicator or a Negative-Acknowledge character (NAK) indicator within the uplink control channel subframe corresponding to the downlink control channel when the downlink control channel is determined to have been successfully decoded. The processor can also be configured to transmit the encoded uplink control channel subframe to a base station.

According to other aspects, a method that facilitates detecting discontinuous transmission (DTX) in a wireless communication environment is described herein. The method can include receiving an uplink control channel subframe from an access terminal. Moreover, the method can include decoding the uplink control channel subframe to identify Channel Quality Indicator (CQI) feedback from the access terminal. Further, the method can include decoding the uplink control channel subframe to detect at least one indicator that distinguishes between successful decoding, a downlink control channel decoding error, and a downlink data channel decoding error encountered by the access terminal.

Yet another aspect relates to a wireless communications apparatus that can include a memory that retains instructions related to obtaining an uplink control channel subframe from an access terminal, decoding the uplink control channel subframe to identify Channel Quality Indicator (CQI) feedback from the access terminal, and decoding the uplink control channel subframe to detect at least one indicator that distinguishes between successful decoding, a downlink control channel decoding error, and a downlink data channel decoding error encountered by the access terminal. Further, the wireless communications apparatus can comprise a processor, coupled to the memory, configured to execute the instructions retained in the memory.

Another aspect relates to a wireless communications apparatus that enables detecting discontinuous transmission (DTX) signaled by an access terminal in a wireless communication environment. The wireless communications apparatus can include means for obtaining an uplink control channel subframe from an access terminal. Further, the wireless communications apparatus can include means for decoding the uplink control channel subframe to recognize Channel Quality Indicator (CQI) feedback and at least one indicator that distinguishes between successful decoding, downlink control channel misdetection, and downlink data channel misdetection encountered by the access terminal.

Still another aspect relates to a computer program product that can comprise a computer-readable medium. The computer-readable medium can include code for receiving an uplink control channel subframe from an access terminal. Moreover, the computer-readable medium can include code for decoding the uplink control channel subframe to recognize Channel Quality Indicator (CQI) feedback and at least one indicator that distinguishes between successful decoding, downlink control channel misdetection, and downlink data channel misdetection experienced by the access terminal.

In accordance with another aspect, an apparatus in a wireless communication system can include a processor, wherein the processor can be configured to obtain an uplink control channel subframe from an access terminal. Moreover, the processor can be configured to decode the uplink control channel subframe to discover Channel Quality Indicator (CQI) feedback from the access terminal. Further, the processor can be configured to decode the uplink control channel subframe to recognize at least one indicator that distinguishes between successful decoding, a downlink control channel decoding error, and a downlink data channel decoding error encountered by the access terminal.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
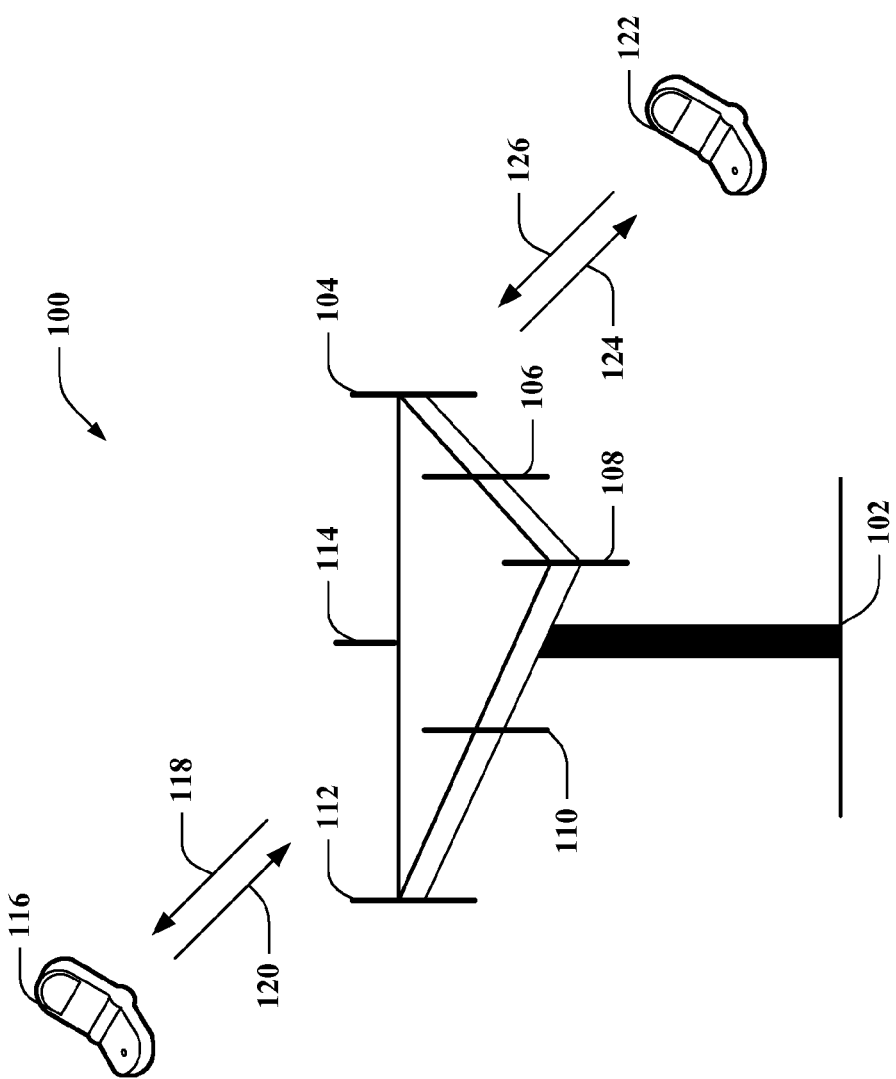
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

System 100 enables employing an enhanced encoding scheme that allows for access terminals 116, 122 to signal downlink control channel misdecoding (e.g., misdecoding of the Physical Downlink Control Channel (PDCCH), . . . ) via an uplink control channel (e.g., Physical Uplink Control Channel (PUCCH), . . . ) with Channel Quality Indicator (CQI) information and Acknowledge character (ACK)/Negative-Acknowledge character (NAK) information. In contrast, conventional encoding schemes (e.g., for the PUCCH, . . . ) typically fail to allow access terminals 116, 122 to signal downlink control channel (e.g., PDCCH, . . . ) misdetection when CQI information and ACK/NAK information is multiplexed in the same PUCCH subframe. Accordingly, with such conventional schemes, base station 102 can be unable to detect whether or not an access terminal (e.g., access terminal 116, 122, . . . ) successfully decoded PDCCH.

System 100 can support discontinuous transmission (DTX) signaling on an uplink control channel (e.g., PUCCH, . . . ). DTX signaling can provide capability of distinguishing between downlink control channel (e.g., PDCCH, . . . ) decoding errors and downlink data channel (e.g., Physical Downlink Shared Channel (PDSCH), . . . ) decoding errors. DTX information can be multiplexed with CQI information and/or ACK/NAK information within a common uplink control channel (e.g., PUCCH, subframe. In contrast, the conventional framework for CQI and ACK/NAK multiplexing for normal cyclic prefix length can fail to support DTX signaling.

DTX signaling on the uplink control channel (e.g., PUCCH, . . . ) enables base station 102 to detect a condition where the downlink control channel (e.g., PDCCH, . . . ) was not decoded by a particular access terminal (e.g., access terminal 116, access terminal 122, . . . ). Base station 102 can detect whether the particular access terminal is operating in DTX mode or non-DTX mode (e.g., for an Acknowledgement (ACK) Channel, . . . ) based upon the DTX signaling.

With DTX detection, base station 102 can better select a redundancy version (RV) to be retransmitted as part of a Hybrid Automatic Repeat-Request (HARQ) technique. For example, upon determining that a given access terminal (e.g., access terminal 116, access terminal 122, . . . ) is operating in DTX mode (e.g., based upon a received DTX indicator, . . . ), base station 102 can recognize that the downlink control channel (e.g., PDCCH, . . . ) was not decoded by the given access terminal. Following this example, since the downlink control channel was determined to be not decoded, base station 102 can further identify that the given access terminal lacks demodulated downlink data channel (e.g., PDSCH, . . . ) information stored in an associated HARQ buffer, and thus, RV=0 can be chosen for retransmission as part of a HARQ technique. By way of a further example, upon recognizing that a certain access terminal (e.g., access terminal 116, access terminal 122, . . . ) is operating in non-DTX mode where a NAK is received from the certain access terminal, base station 102 can identify that the downlink control channel (e.g., PDCCH, . . . ) was decoded by the certain access terminal and the downlink data channel (e.g., PDSCH, . . . ) failed to be decoded by the certain access terminal. Pursuant to this example, base station 102 can determine that the certain access terminal has a received version of RV=0 stored in an associated HARQ buffer; based thereupon, base station 102 can select a redundancy version other than RV=0 (e.g., RV=1, . . . ) for retransmission to the certain access terminal as part of the HARQ technique.

Moreover, DTX detection can be utilized by base station 102 to estimate a downlink control channel (e.g., PDCCH, . . . ) decoding error rate for each access terminal 116, 122. Based upon the estimated decoding error rates, base station 102 can optimize allocation of resources (e.g., number of control channel elements (CCEs), transmit power employed by base station 102, . . . ) for downlink control channel (e.g., PDCCH, . . . ) transmissions for each access terminal 116, 122 individually. By way of further illustration, base station 102 can utilize the estimated decoding error rates to optimize resource allocation for a collection of access terminals.

Figure 2:
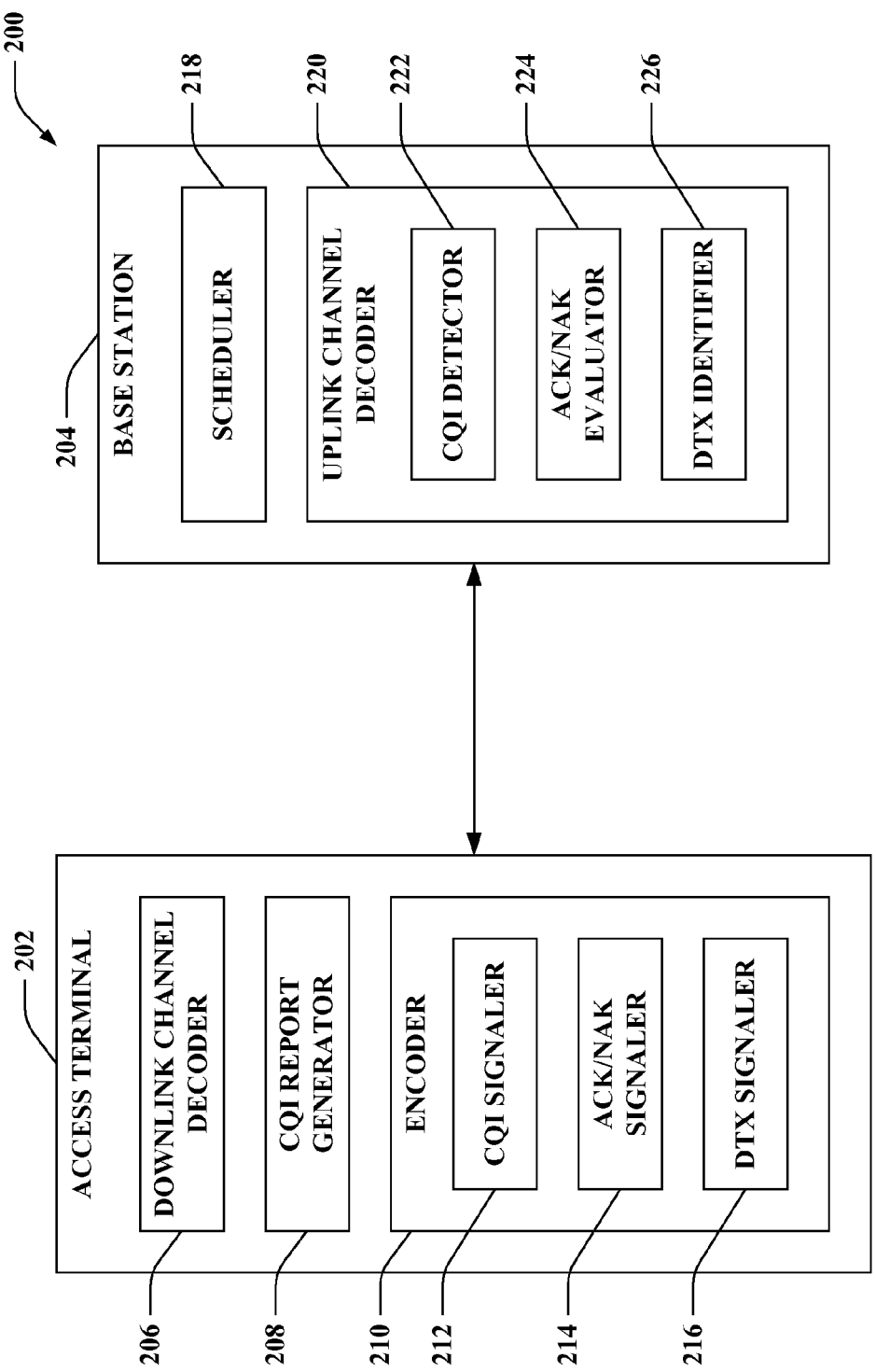
FIG. 2 is an illustration of an example system that employs DTX signaling in a wireless communication environment.

Referring to FIG. 2, illustrated is a system 200 that employs DTX signaling in a wireless communication environment. System 200 includes an access terminal 202 that can transmit and/or receive information, signals, data, instructions, commands, bits, symbols, and the like. Access terminal 202 can communicate with a base station 204 via the forward link and/or reverse link. Base station 204 can transmit and/or receive information, signals, data, instructions, commands, bits, symbols, and the like. Moreover, although not shown, it is contemplated that any number of access terminals similar to access terminal 202 can be included in system 200 and/or any number of base stations similar to base station 204 can be included in system 200. According to an illustration, system 200 can be a Long Term Evolution (LTE) based system; however, the claimed subject matter is not so limited.

Access terminal 202 can include a downlink channel decoder 206 that decodes information, signals, data, instructions, commands, bits, symbols, etc. obtained via a downlink channel. For instance, downlink channel decoder 206 can decode a downlink control channel (e.g., PDCCH, . . . ), a downlink data channel (e.g., PDSCH, . . . ), and the like. By way of illustration, downlink decoder 206 can decode an assignment conveyed via the PDCCH that schedules uplink channel resources (e.g., time and frequency for sending a transmission via an uplink channel, PUCCH resources, . . . ) to be utilized by access terminal 202; however, the claimed subject matter is not so limited. Pursuant to another illustration, downlink channel decoder 206 can decode, demodulate, etc. data obtained via the PDSCH.

Access terminal 202 can further include a CQI report generator 208 that yields CQI reports that provide information related to channel quality. CQI report generator 208 can yield the CQI reports with substantially any periodicity. Alternatively, CQI report generator 208 can nonperiodically yield CQI reports.

Moreover, access terminal 202 can include an encoder 210 that encodes signals for transmission. For instance, encoder 210 can multiplex various signals, and the multiplexed signals can thereafter be transmitted by access terminal 202 (e.g., via a transmitter (not shown), antenna(s) (not shown), . . . ) to base station 204. The multiplexed signals can be sent over an uplink control channel (e.g., PUCCH, . . . ) to base station 204, for example; the claimed subject matter, however, is not so limited.

Encoder 210 can further include a CQI signaler 212, an ACK/NAK signaler 214, and a DTX signaler 216. CQI signaler 212 can obtain a CQI report from CQI report generator 208 and incorporate such CQI report into encoded signals sent over the uplink. Further, ACK/NAK signaler 214 can insert an ACK indicator into the encoded signals when downlink channel decoder 206 successfully demodulates information sent over the downlink data channel (e.g., PDSCH, . . . ) or a NAK indicator into the encoded signals when downlink channel decoder 206 fails to successfully demodulate information sent over the downlink data channel (e.g., PDSCH, . . . ). Moreover, DTX signaler 216 can incorporate a DTX indicator into the encoded signals when downlink channel decoder 206 fails to successfully decode an assignment sent over the downlink control channel (e.g., PDCCH, . . . ). Accordingly, DTX signaler 216 can notify base station 204 that access terminal 202 is operating in DTX mode (e.g., in connection with an Acknowledgement (ACK) Channel, . . . ) by including the DTX indicator in the encoded signals sent over the uplink (e.g., via PUCCH, . . . ). By leveraging CQI signaler 212, ACK/NAK signaler 214, and DTX signaler 216, encoder 210 can multiplex CQI information, ACK/NAK information, and/or DTX information into a common uplink control channel (e.g., PUCCH, . . . ) subframe.

Base station 204 can further include a scheduler 218 and an uplink channel decoder 220. Scheduler 218 can assign resources (e.g., uplink resources, downlink resources, . . . ) for use by access terminal 202. For instance, scheduler 218 can allocate uplink resources to access terminal 202 and yield an assignment that can be transferred to access terminal 202 to indicate such allocation of uplink resources. By way of further illustration, assignments generated by scheduler 218 can be transferred to access terminal 202 via the downlink control channel (e.g., PDCCH, . . . ); however, the claimed subject matter is not so limited.

Moreover, uplink channel decoder 220 can decode signals received by base station 204 via the uplink. For example, uplink channel decoder 220 can demultiplex a plurality of signals obtained via the uplink (e.g., plurality of symbols received within a common subframe, . . . ). According to a further example, uplink channel decoder 220 can demodulate signals received over the uplink control channel (e.g., PUCCH, . . . ).

Uplink channel decoder 220 can further include a CQI detector 222, an ACK/NAK evaluator 224, and a DTX identifier 226. CQI detector 222 can recognize CQI information received as part of an uplink transmission from access terminal 202. Further, ACK/NAK evaluator 224 can identify whether an ACK indicator or a NAK indicator is included within the uplink transmission. The ACK indicator or the NAK indicator can be sent by access terminal 202 as a function of whether a downlink transmission sent by base station 204 via a downlink data channel (e.g., PDSCH, was successfully decoded by access terminal 202 (e.g., by downlink channel decoder 206, . . . ). Moreover, DTX identifier 226 can recognize when the uplink transmission includes a DTX indicator to distinguish whether or not the uplink transmission is a DTX transmission sent by access terminal 202. Hence, DTX identifier 226 can detect when access terminal 202 is operating in DTX mode.

According to an illustration, DTX signaling can naturally occur when an access terminal conventionally transmits PUCCH format 0 or 1. Following this illustration, when the access terminal misses the PDCCH, PUCCH DTX can result. Further, this can be detectable by a base station (e.g., if the base station employs a three-state receiver, . . . ). The foregoing illustration, however, fails to consider the case where CQI information is multiplexed with an ACK indicator or a NAK indicator.

When an ACK indicator or a NAK indicator is multiplexed with CQI information on the PUCCH, the aforementioned DTX signaling does not naturally occur because the CQI information would be transmitted irrespective of a PDCCH decoding result. Further, conventional schemes typically encode CQI information plus a NAK indicator as the same transmit waveform as the CQI information alone (e.g., standalone CQI information with no ACK/NAK multiplexing, . . . ). Accordingly, these conventional schemes can fail to enable the base station to detect DTX operation of an access terminal.

Commonly employed schemes can modulate a PUCCH reference signal (RS) symbols with ACK or NAK information. For instance, in each slot, two reference signal symbols can be transmitted to provide phase reference for PUCCH decoding with normal cyclic prefix length. In the case of CQI only transmission (e.g., without an ACK or a NAK, which can occur when the access terminal is in DTX mode, . . . ), the two reference signal symbols within a slot can both be set to '1'. Further, in the case of CQI plus ACK or NAK transmission, the first of the two reference signal symbols within a slot can be set to '1' while the second reference signal symbol within the slot can be set to '1' or '−1' to signal ACK or NAK in the single input multiple output (SIMO) case, or it can be set to one of four quadrature phase-shift keying (QPSK) symbols to signal NAK/NAK, ACK/NAK, NAK/ACK or ACK/ACK for two multiple input multiple output (MIMO) streams. For example, the mapping utilized for the MIMO case can be as follows: NAK/NAK can map to '1', ACK/NAK can map to 'j', NAK/ACK can map to '−j', and ACK/ACK can map to '−1'. It is to be appreciated, however, that other mappings and/or other selections of constellation points can alternatively be utilized. Moreover, for instance, the transmitted symbols can be rotated 45 degrees in order to match the conventional QPSK constellation; however, the claimed subject matter is not so limited.

System 200 modifies the foregoing in order to make possible DTX signaling by access terminal 202 and DTX detection by base station 204. Access terminal 202 can signal a missed PDCCH condition on an uplink PUCCH when the PUCCH carries CQI multiplexed with ACK or NAK information in the same subframe for normal cyclic prefix length. Various signaling options can be employed by access terminal 202 for downlink SIMO operation and/or downlink MIMO operation.

By way of further example, when base station 204 has not scheduled (e.g., utilizing scheduler 218, . . . ) access terminal 202 to send a transmission over the uplink, yet an uplink transmission (e.g., PUCCH subframe, . . . ) is received, uplink channel decoder 220 can condition PUCCH decoding assuming that access terminal 202 is in DTX state. Thus, uplink channel decoder 220 (e.g., DTX identifier 226, . . . ) can decode the obtained PUCCH subframe assuming that DTX was signaled by access terminal 202. Therefore, decoding performance in this case can be substantially similar to performance in conventional schemes, and hence, addition of DTX signaling can lack significant detrimental impact on performance of the CQI-only format.

Figure 3:
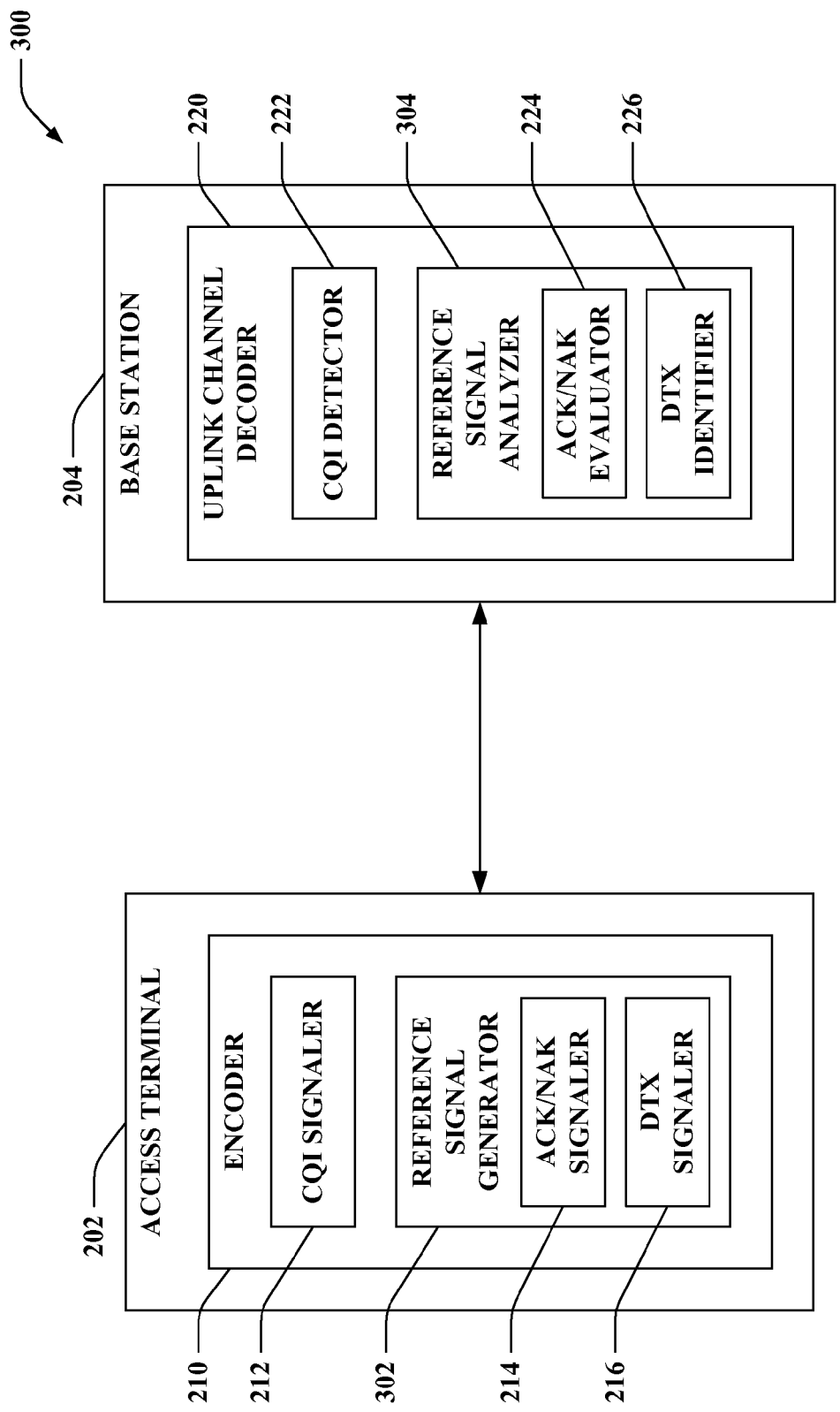
FIG. 3 is an illustration of an example system that utilizes reference signals to signal DTX in a wireless communication environment.

Now referring to FIG. 3, illustrated is a system 300 that utilizes reference signals to signal DTX in a wireless communication environment. System 300 comprises access terminal 202, which can further include encoder 210, and base station 204, which can further include uplink channel decoder 220. Encoder 210 can include CQI signaler 212, which encodes CQI information (e.g., yielded by CQI report generator 208 of FIG. 2, . . . ) for transmission to base station 204.

Encoder 210 can also include a reference signal generator 302, which can further include ACK/NAK signaler 214 and DTX signaler 216, for example. Pursuant to this example, reference signal generator 302 can leverage ACK/NAK signaler 214 and DTX signaler 216 to encode an ACK indicator, a NAK indicator, and/or a DTX indicator with reference signal symbols, which can be transmitted over an uplink control channel (e.g., PUCCH, . . . ). Thus, following the depicted example, two symbols (e.g., reference signals, . . . ) within a slot can be encoded to signal ACK, NAK, or DTX to base station 204, while a remainder of symbols (e.g., five remaining symbols, . . . ) in the slot can be encoded by CQI signaler 212 with CQI information.

Uplink channel decoder 220 can include CQI detector 222 and a reference signal analyzer 304. Reference signal analyzer 304 can further comprise ACK/NAK evaluator 224 and DTX identifier 226, and can evaluate received reference signal symbol(s) to detect whether access terminal 202 (e.g., reference signal generator 302, . . . ) has signaled ACK, NAK, or DTX. Accordingly, as illustrated, reference signal symbol(s) (e.g., two symbols, . . . ) within a slot can be decoded by reference signal analyzer 304 (e.g., leveraging ACK/NAK evaluator 224 and DTX identifier 226, . . . ) to detect an ACK indicator, a NAK indicator, or a DTX indicator, while a remainder of the symbols in the slot can be evaluated by CQI detector 222 to determine CQI feedback provided by access terminal 202.

According to an illustration, system 300 can be employed with downlink SIMO. Reference signal generator 302 can set a first reference signal symbol to '1' (or any other preset value). Further, reference signal generator 302 (e.g., based upon whether ACK, NAK or DTX is to be provided via ACK/NAK signaler 214 and DTX signaler 216, . . . ) can set a second reference signal symbol to one of three possible QPSK symbols (e.g., a three element subset of a four-element QPSK constellation, By way of example, reference signal generator 302 can employ the following mapping for the second reference signal: NAK can be mapped to '1', ACK can be mapped to '−1', and DTX can be mapped to 'j'. According to another example, if a DTX indicator is not transmitted, then DTX can be mapped to '1' for the second reference signal. It is contemplated, however, that any mapping is intended to fall within the scope of the heretoappended claims. Further, for instance, uplink channel decoder 220 can evaluate three possible hypotheses in connection with SIMO operation when such an encoding scheme is leveraged.

The above mapping can minimize decoding errors where a NAK is mistaken for an ACK (or an ACK is mistaken for a NAK) for the QPSK constellation when reference signal analyzer 304 independently decodes ACK, NAK, and DTX based on modulated reference signal symbols. Other mappings can alternatively be employed in connection with DTX signaling such as, for example, 3-PSK constellation points, conventional QPSK constellation points (e.g., rotated 45 degrees from the constellation described above, {[(1,j), (−1, j), (1,−j), (−1,−j)]/sqrt(2)}, . . . ), and the like.

Further, the foregoing illustrates an example of modeling DTX with ACK/NAK modulated reference signal symbols (e.g., pilots, . . . ). According to another example, QPSK modulation can be used for both reference signal symbols (e.g., both pilots, . . . ) transferred via the uplink within a slot rather than setting a first reference signal symbol to '1' (or any other predetermined value) and modulating the second reference signal symbol to encode ACK, NAK or DTX. For instance, the first reference signal symbol can be set to one of '1', '−1', 'j', or '−j' and the second reference signal symbol can be set to one of '1', '−1', 'j', or '−j', which results in 16 different combinations. For DTX and ACK/NAK signaling, three out of these 16 possible combinations can be selected to maximize distance among ACK, NAK and DTX, thereby minimizing an impact of channel phase variations on detectability by reference signal analyzer 304.

In case of downlink MIMO where two bits are utilized to indicate ACK and/or NAK, DTX signaling can be omitted in connection with system 300, for example. Omission of DTX signaling can be substantially similar to sending '1' on the first reference signal symbol and '1' on the second reference signal symbol when operating in DTX mode (e.g., which can be substantially similar to indicating NAK/NAK for the two MIMO streams, . . . ). Following this example, when in MIMO mode, access terminal 202 can operate on average at higher geometries; therefore, a PDCCH decoding error rate can be reduced with a smaller downlink power overhead compared to employment of SIMO on average. Hence, lack of DTX signaling can have a smaller impact. It is to be appreciated, however, that the claimed subject matter is not limited to the foregoing example.

Figure 4:
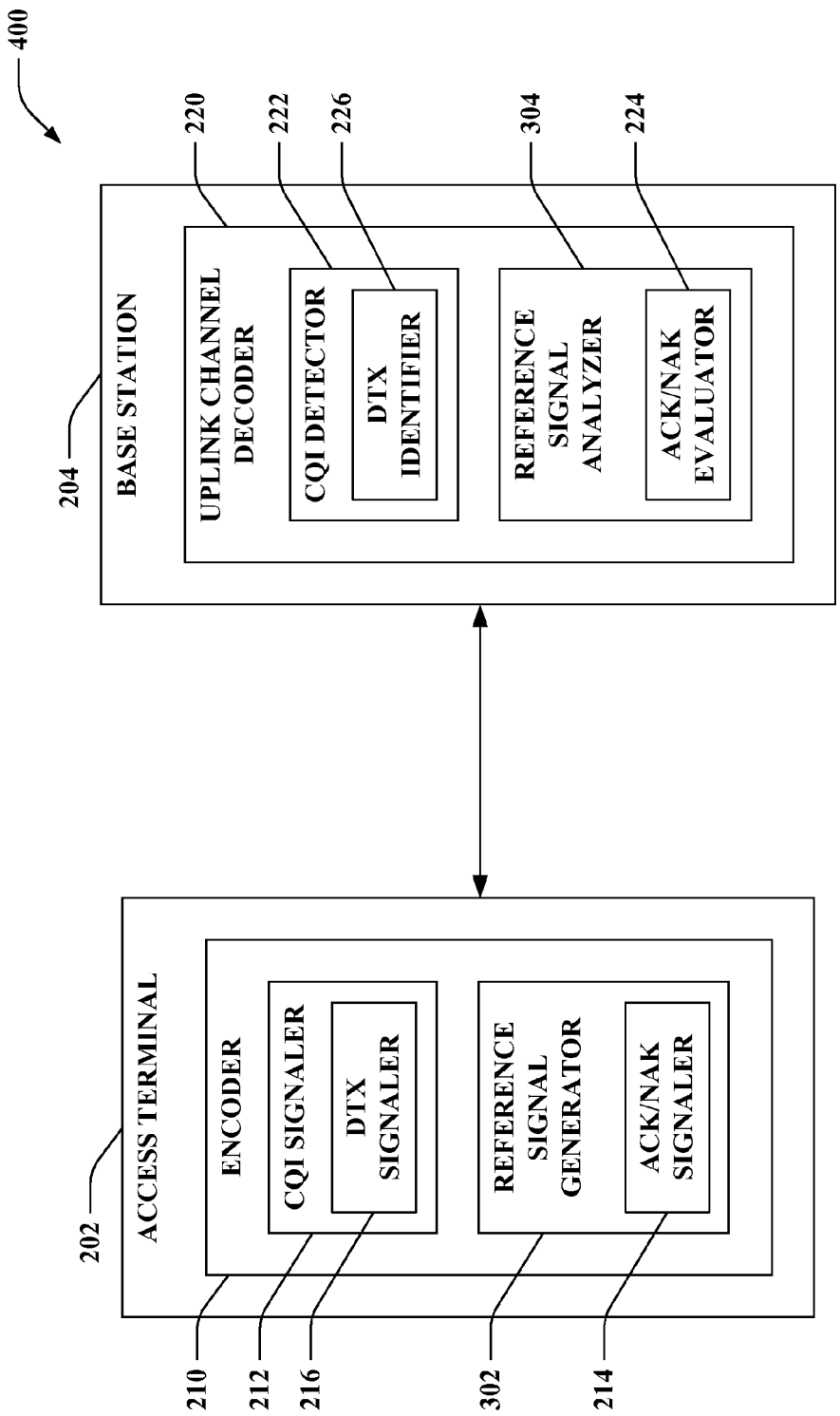
FIG. 4 is an illustration of an example system that encodes DTX information with CQI information in a wireless communication environment.

Turning to FIG. 4, illustrated is a system 400 that encodes DTX information with CQI information in a wireless communication environment. System 400 includes access terminal 202 and base station 204. Access terminal 202 comprises encoder 210, which further includes CQI signaler 212 and reference signal generator 302. CQI signaler 212 can further include DTX signaler 216 and reference signal generator 302 can further include ACK/NAK signaler 214. Moreover, base station 204 can comprise uplink channel decoder 220. Uplink channel decoder 220 includes CQI detector 222, which can further comprise DTX identifier 226, and reference signal analyzer 304, which can further include ACK/NAK evaluator 224.

By way of example, CQI information and DTX information can be encoded together by CQI signaler 212 and DTX signaler 216. For instance, DTX signaler 216 can add a transmission state bit in addition to CQI information bits provided by CQI signaler 212. A value of the additional transmission state bit can indicate whether or not access terminal 202 is in DTX state. Moreover, the CQI information bits and the transmission state bit can be encoded jointly. For instance, Reed-Muller (RM) encoding (e.g., RM or RM with computer generated extension, . . . ) can be employed, and the additional transmission state bit can toggle between linearly adding or not adding a particular RM (or computer generated) basis vector.

Further, CQI detector 222 and DTX identifier 226 can evaluate, decode, demodulate, etc. the combined, encoded information received from access terminal 202 to extract the CQI information and the DTX information included therein. For example, DTX identifier 226 can determine a value of the additional transmission state bit to recognize whether or not access terminal 202 is operating in DTX state (e.g., to recognize whether PDCCH was successfully decoded by access terminal 202, . . . ).

Moreover, reference signal symbols yielded by reference signal generator 302 can be set by ACK/NAK signaler 214 to signal an ACK or a NAK, for instance. Thus, reference signal analyzer 304 (e.g., and/or ACK/NAK evaluator 224, . . . ) can evaluate received reference signal symbols to identify an ACK or a NAK sent by access terminal 202.

It is to be appreciated that system 400 can be employed in connection with downlink SIMO operation and/or downlink MIMO operation. When base station 204 schedules a downlink transmission for access terminal 202 corresponding to a particular received PUCCH subframe, uplink channel decoder 220 generally can evaluate three possible hypotheses in the case of downlink SIMO operation and five possible hypotheses in the case of downlink MIMO operation. Further, base station 204 can employ a maximum likelihood (ML) receiver to jointly decode CQI and ACK/NAK, and thus, the selection of hypotheses can occur by way of selecting a correct set of combined hypotheses. As an example, under the SIMO scenario, a combination of DTX encoded with CQI, and ACK encoded with reference signal symbols can be excluded from the set of ML hypotheses. Similarly, for the MIMO case, any combination of DTX encoded with CQI, along with anything other than NAK/NAK encoded with reference signal symbols can be excluded from the set of ML hypotheses. Based upon the above considerations, moderate overall impact of DTX signaling on PUCCH decoding performance can result.

Figure 5:
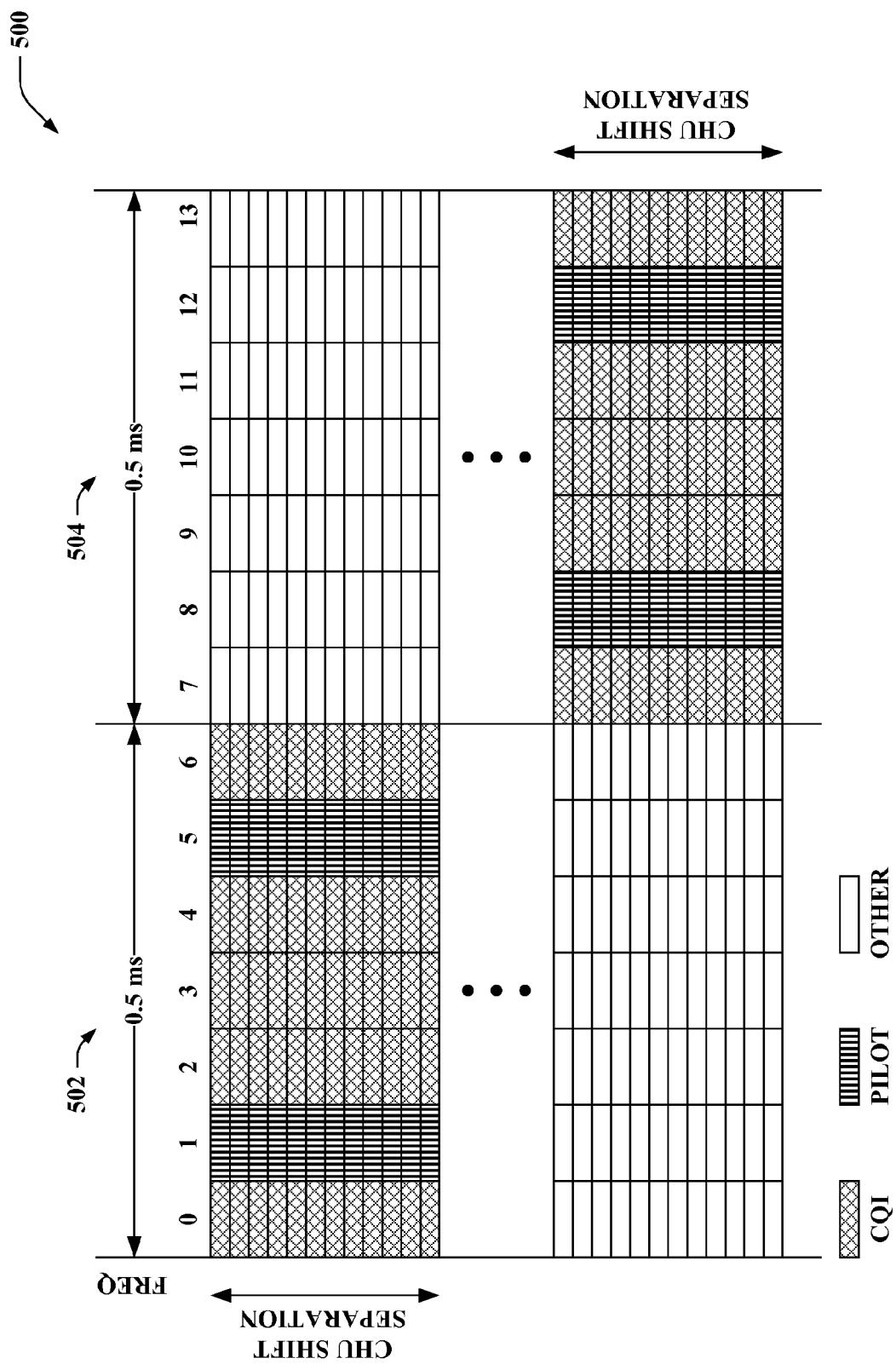
FIG. 5 is an illustration of an example PUCCH subframe that can be employed in connection with DTX signaling within a wireless communication environment.

With reference to FIG. 5, illustrated is an example PUCCH subframe 500 that can be employed in connection with DTX signaling within a wireless communication environment. PUCCH subframe 500 includes two consecutive slots, slot 502 and slot 504 (e.g., slot 502 and slot 504 can each be 0.5 ms, . . . ). Further, as depicted, each slot 502-504 can include seven symbols (e.g., with normal cyclic prefix length, . . . ). Within a given slot, two symbols can be reference signal symbols and five symbols can be CQI symbols. Thus, in slot 502, symbols 1 and 5 can be reference signal symbols and symbols 0, 2, 3, 4, and 6 can be CQI symbols. Similarly, in slot 504, symbols 8 and 12 can be reference signal symbols and symbols 7, 9, 10, 11, and 13 can be CQI symbols. According to an example as described above, DTX can be signaled based upon selection of reference signal symbols (e.g., along with ACK/NAK information, . . . ). Pursuant to another example described herein, DTX can be signaled based upon an additional transmission state bit that can be encoded within the CQI symbols. It is to be appreciated, however, that the claimed subject matter is not limited to the foregoing.

Figure 6:
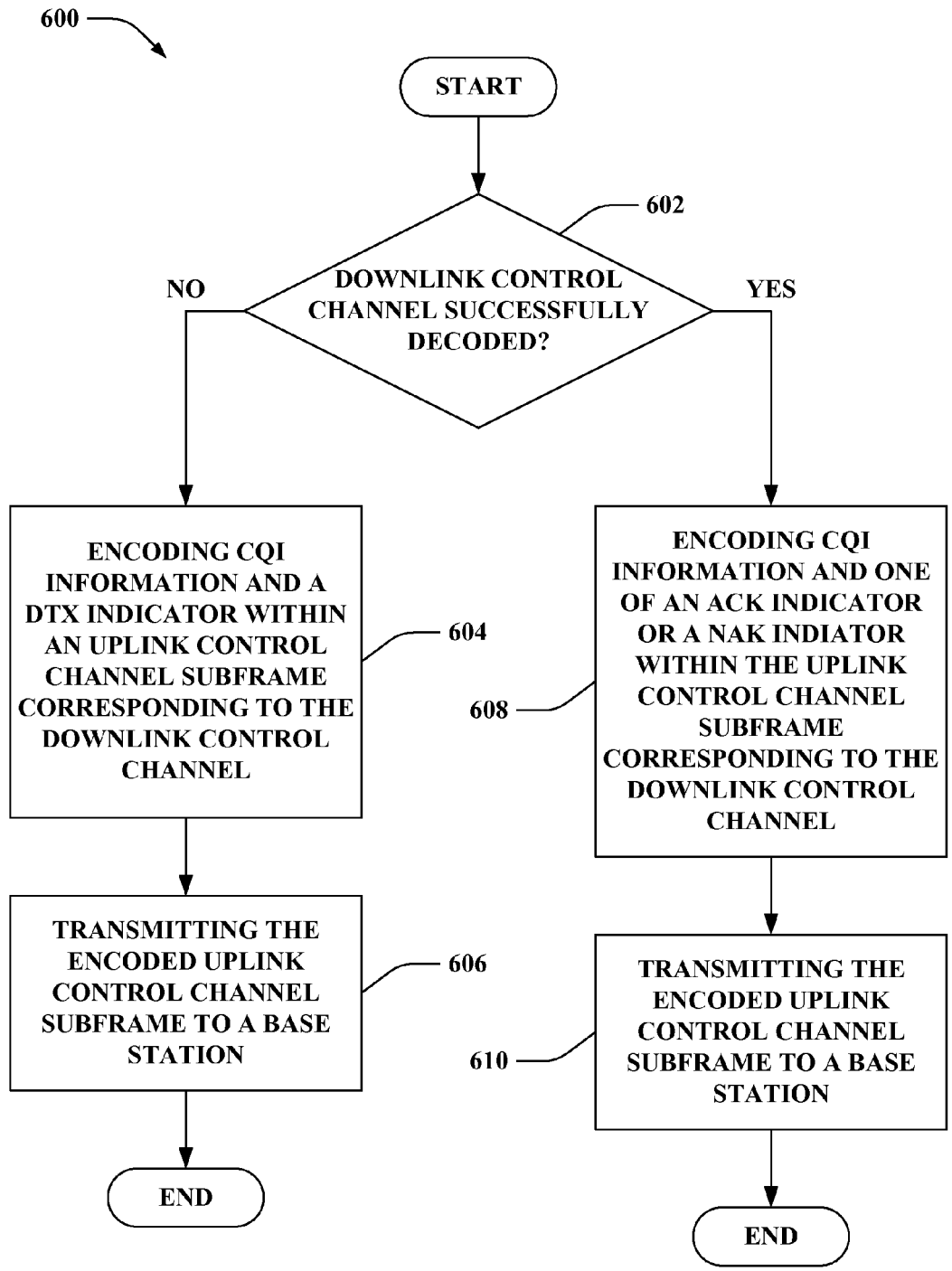
FIG. 6 is an illustration of an example methodology that facilitates signaling discontinuous transmission (DTX) to a base station in a wireless communication environment.
Figure 7:
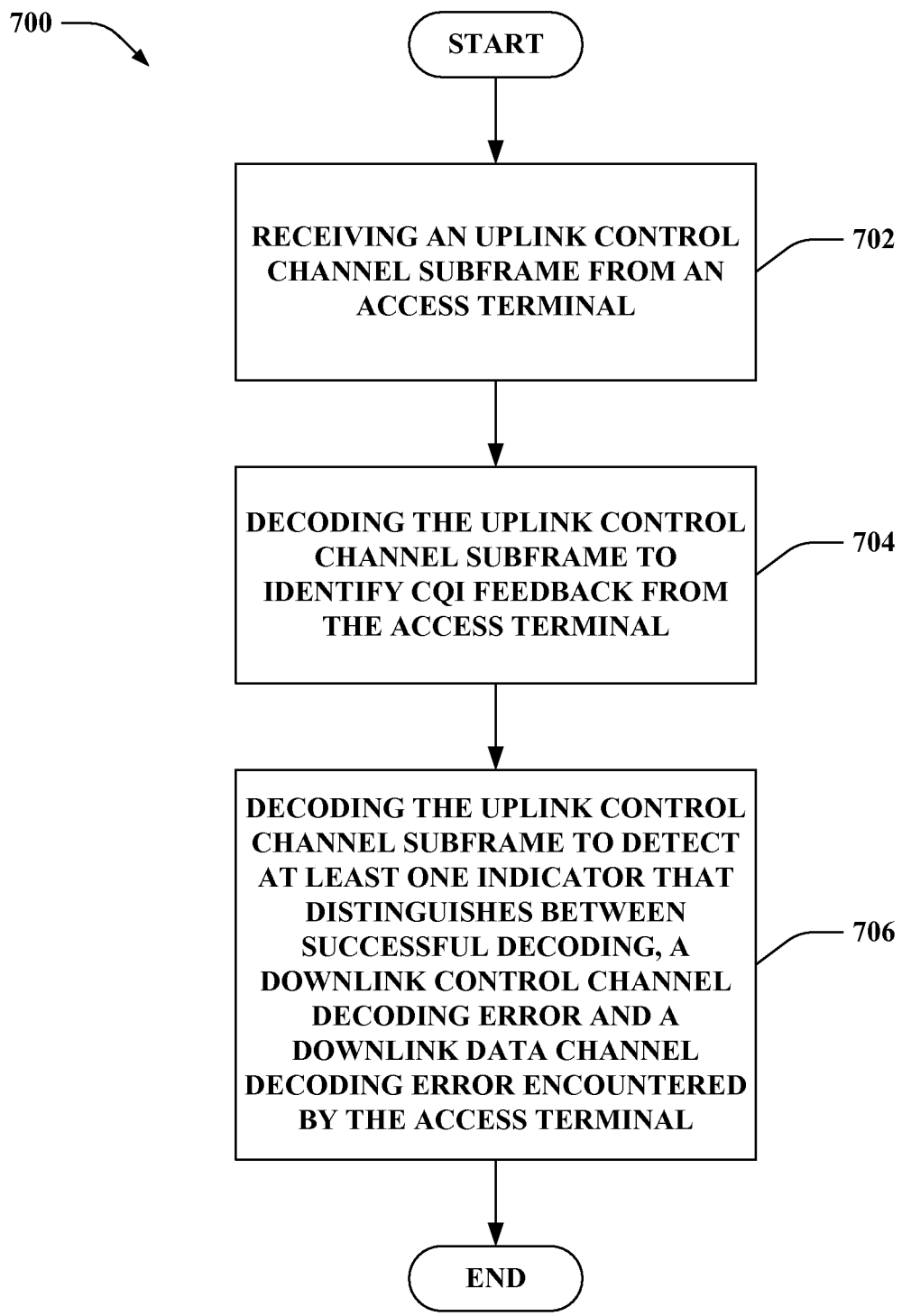
FIG. 7 is an illustration of an example methodology that facilitates detecting discontinuous transmission (DTX) in a wireless communication environment.

Referring to FIGS. 6-7, methodologies relating to signaling and detecting DTX in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 6, illustrated is a methodology 600 that facilitates signaling discontinuous transmission (DTX) to a base station in a wireless communication environment. At 602, a determination can be effectuated as to whether a downlink control channel is successfully decoded. The downlink control channel, for instance, can be a Physical Downlink Control Channel (PDCCH). Further, the downlink control channel can provide an assignment of resources (e.g., time and frequency, . . . ) for utilization in connection with an uplink transmission (e.g., transmission over a corresponding uplink control channel, . . . ). Thus, the determination performed at 602 can be to recognize whether an assignment sent via the downlink control channel is received and successfully decoded.

When the downlink control channel is determined to not have been successfully decoded at 602 (e.g., the assignment has not been received and/or decoded, . . . ), methodology 600 can continue to 604. At 604, Channel Quality Indicator (CQI) information and a DTX indicator can be encoded within an uplink control channel subframe corresponding to the downlink control channel. The uplink control channel subframe can be a Physical Uplink Control Channel (PUCCH) subframe. According to an example, a first set of symbols (e.g., reference signal symbols, two symbols, . . . ) within a slot can be encoded to include the DTX indicator, and a second set of symbols (e.g., non-reference signal symbols, five symbols, remaining symbols, . . . ) within the slot can be encoded to include the CQI information, where symbols in the first set can be mutually exclusive from symbols in the second set. By way of a further example, a bit set to a value corresponding to the DTX indicator can be added to bits representing the CQI information, and a common set of symbols can be encoded to jointly include the combination of the DTX indicator and the CQI information. At 606, the encoded uplink control channel subframe can be transmitted to a base station. Accordingly, DTX can be signaled to the base station.

When the downlink control channel is determined to have been successfully decoded at 602 (e.g., the assignment has been received and decoded, methodology 600 can continue to 608. At 608, CQI information and one of an Acknowledge character (ACK) indicator or a Negative-Acknowledge character (NAK) indicator can be encoded within the uplink control channel subframe corresponding to the downlink control channel. For example, a first set of symbols (e.g., reference signal symbols, two symbols, . . . ) within a slot can be encoded to include the ACK indicator or the NAK indicator, and a second set of symbols (e.g., non-reference signal symbols, five symbols, remaining symbols, . . . ) within the slot can be encoded to include the CQI information, where symbols in the first set can be mutually exclusive from symbols in the second set. According to a further example, a bit set to a value corresponding to non-DTX operation can be added to bits representing the CQI information, and a set of symbols can be encoded to jointly include the combination of these bits. At 610, the encoded uplink control channel subframe can be transmitted to the base station.

According to an example encoding scheme, a first set of symbols (e.g., reference signal symbols, two symbols, . . . ) within the slot can be encoded to include the DTX indicator when the downlink control channel is not successfully decoded and can be encoded to include one of the ACK indicator or the NAK indicator when the downlink control channel is successfully decoded (e.g., as determined at 602, . . . ). For instance, symbols in the first set can employ a first mapping when incorporating the DTX indicator, a second mapping when incorporating the ACK indicator, and a third mapping when incorporating the NAK indicator. As an illustration, a first symbol (e.g., first reference signal symbol, . . . ) in the first set can be set to '1' and a second symbol (e.g., second reference signal symbol, . . . ) in the first set can be set to one of a plurality of possible values (e.g., set to 'j' for DTX, '−1' for ACK, and '1' for NAK, set to '1' for DTX, '−1' for ACK, and '1' for NAK, . . . ); however, it is to be appreciated that the claimed subject matter is not limited to the foregoing illustration as it is contemplated that any mapping is intended to fall within the scope of the hereto appended claims. Moreover, as part of this example encoding scheme, a second set of symbols (e.g., non-reference signal symbols, five symbols, remaining symbols, . . . ) within the slot can be encoded to include the CQI information, where symbols in the first set can be mutually exclusive from symbols in the second set. Further, this example encoding scheme can be utilized in connection with downlink single input multiple output (SIMO) operation. According to another illustration, a first symbol (e.g., first reference signal symbol, in the first set can be set to '1' and a second symbol (e.g., second reference signal symbol, . . . ) in the first set can be set to '1' when in DTX mode in connection with downlink multiple input multiple output (MIMO) operation.

By way of another example encoding scheme, a transmission state bit can be added to CQI information bits. A value of the transmission state bit can be set as a function of whether DTX mode or non-DTX mode is employed (e.g., whether or not the downlink control channel was successfully decoded to yield a corresponding assignment of uplink control channel resource(s), . . . ). Further, the transmission state bit can toggle between linearly adding or not adding a particular Reed-Muller (RM) basis vector based upon DTX or non-DTX operation. This example encoding scheme, for instance, can be employed in connection with downlink SIMO operation and/or downlink multiple input multiple output (MIMO) operation.

Now turning to FIG. 7, illustrated is a methodology 700 that facilitates detecting discontinuous transmission (DTX) in a wireless communication environment. At 702, an uplink control channel subframe can be received from an access terminal. The uplink control channel subframe can be a Physical Uplink Control Channel (PUCCH) subframe. According to an illustration, the uplink control channel subframe can fail to correspond to an assignment sent via a downlink transmission to the access terminal, and therefore, DTX state can be assumed for the access terminal. By way of further example, the uplink control channel subframe can correspond to an assignment transferred via a downlink transmission to the access terminal, and thus, the uplink control channel subframe can be decoded to distinguish between DTX and non-DTX operation by the access terminal.

At 704, the uplink control channel subframe can be decoded to identify CQI feedback from the access terminal. At 706, the uplink control channel subframe can be decoded to detect at least one indicator that distinguishes between successful decoding, a downlink control channel decoding error and a downlink data channel decoding error encountered by the access terminal. The at least one indicator can be one or more of a DTX indicator, an Acknowledge character (ACK) indicator or a Negative-Acknowledge character (NAK) indicator. According to an illustration, the CQI feedback and the at least indicator can be jointly decoded, separately decoded, a combination thereof, and so forth. By way of example, the at least one indicator can be detected from a first set of symbols (e.g., two reference signal symbols, . . . ) within a slot, and the CQI feedback can be identified from a second set of symbols (e.g., non-reference signal symbols, five symbols, remaining symbols, . . . ) within the slot. Pursuant to a further example, the at least one indicator can be detected based at least in part upon a value of a transmission state bit added to CQI information bits carried by a set of symbols within the uplink control channel subframe.

It will be appreciated that, in accordance with one or more aspects described herein, inferences can be made regarding signaling and/or detecting DTX in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting a most likely combination of CQI information and ACK/NAK/DTX indicator(s) sent by an access terminal. By way of further illustration, an inference can be made related to determining mappings to employ in connection with DTX signaling. It will be appreciated that the foregoing examples are illustrative in nature and are not intended to limit the number of inferences that can be made or the manner in which such inferences are made in conjunction with the various embodiments and/or methods described herein.

Figure 8:
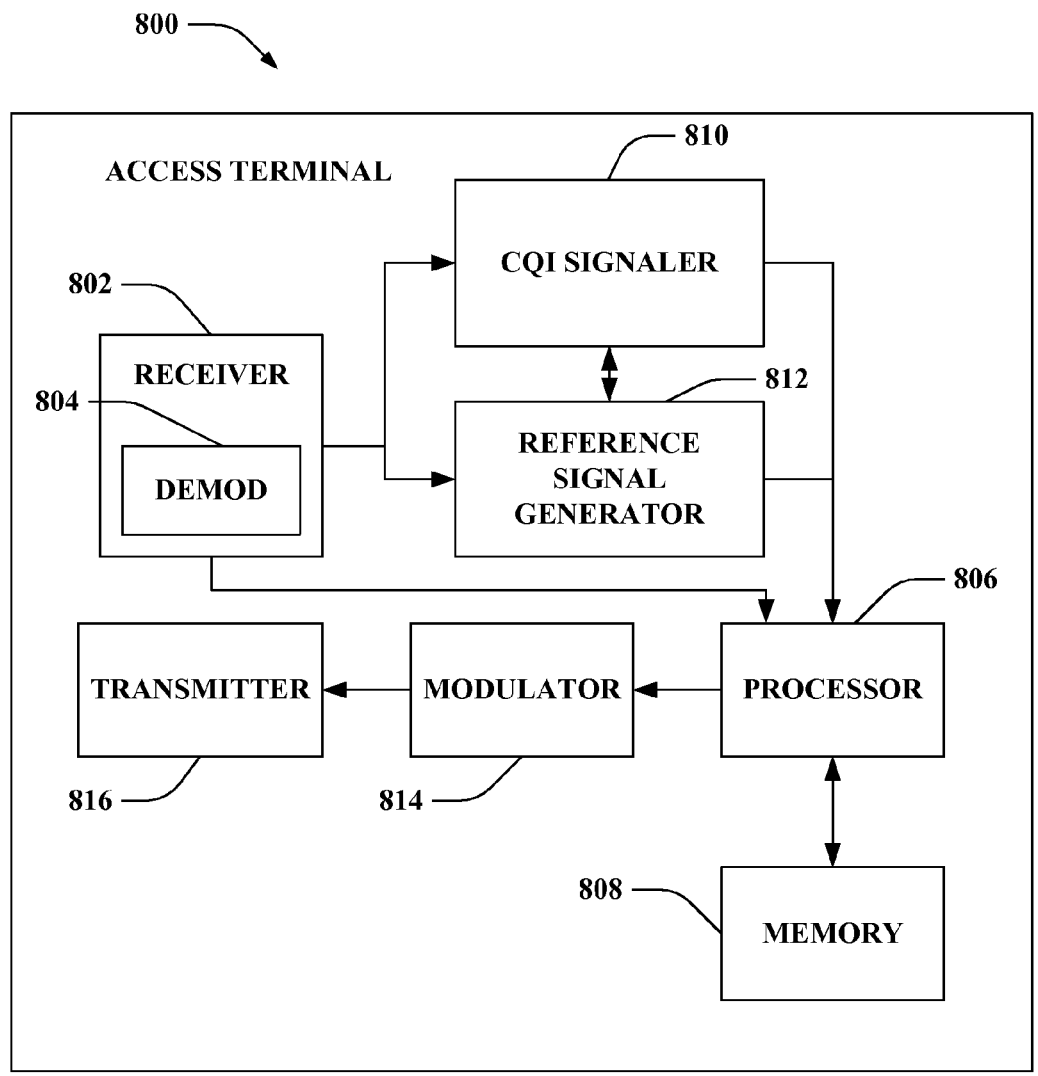
FIG. 8 is an illustration of an example access terminal that sends a DTX indicator to a base station in a wireless communication system.

FIG. 8 is an illustration of an access terminal 800 that sends a DTX indicator to a base station in a wireless communication system. Access terminal 800 comprises a receiver 802 that receives a signal from, for instance, a receive antenna (not shown), and performs typical actions thereon (e.g., filters, amplifies, downconverts, etc.) the received signal and digitizes the conditioned signal to obtain samples. Receiver 802 can be, for example, an MMSE receiver, and can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of access terminal 800, and/or a processor that both analyzes information received by receiver 802, generates information for transmission by transmitter 816, and controls one or more components of access terminal 800.

Access terminal 800 can additionally comprise memory 808 that is operatively coupled to processor 806 and that can store data to be transmitted, received data, and any other suitable information related to performing the various actions and functions set forth herein. Memory 808, for instance, can store protocols and/or algorithms associated with signaling CQI information along with one or more of a DTX indicator, an ACK indicator or a NAK indicator within a common PUCCH subframe. Further, memory 808 can store protocols and/or algorithms for yielding CQI information.

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Processor 806 can be operatively coupled to a CQI signaler 810 and/or a reference signal generator 812. CQI signaler 810 can be substantially similar to CQI signaler 212 of FIG. 2 and/or reference signal generator 812 can be substantially similar to reference signal generator 302 of FIG. 3. CQI signaler 810 can yield CQI information for inclusion in PUCCH subframe. For instance, CQI signaler 810 can include CQI information within non-reference signal symbols in a slot. Further, reference signal generator 812 can yield reference signal symbols for the same slot. Moreover, it is to be appreciated that access terminal 800 can operate in DTX or non-DTX mode. According to an example, when in DTX mode, reference signal generator 812 can incorporate a DTX indicator into the yielded reference signal symbols. Following this example, when in non-DTX mode, reference signal generator 812 can incorporate an ACK indicator or a NAK indicator into the generated reference signal symbols. By way of another example, CQI signaler 810 can set a value for an additional bit added to the CQI information bits as a function of whether or not access terminal 800 is in DTX mode or non-DTX mode. Although not shown, it is to be appreciated that access terminal 800 can include an ACK/NAK signaler, which can be substantially similar to ACK/NAK signaler 214 of FIG. 2, and/or a DTX signaler, which can be substantially similar to DTX signaler 216 of FIG. 2. Access terminal 800 still further comprises a modulator 814 and a transmitter 816 that transmits data, signals, etc. to a base station. Although depicted as being separate from the processor 806, it is to be appreciated that CQI signaler 810, reference signal generator 812 and/or modulator 814 can be part of processor 806 or a number of processors (not shown).

Figure 9:
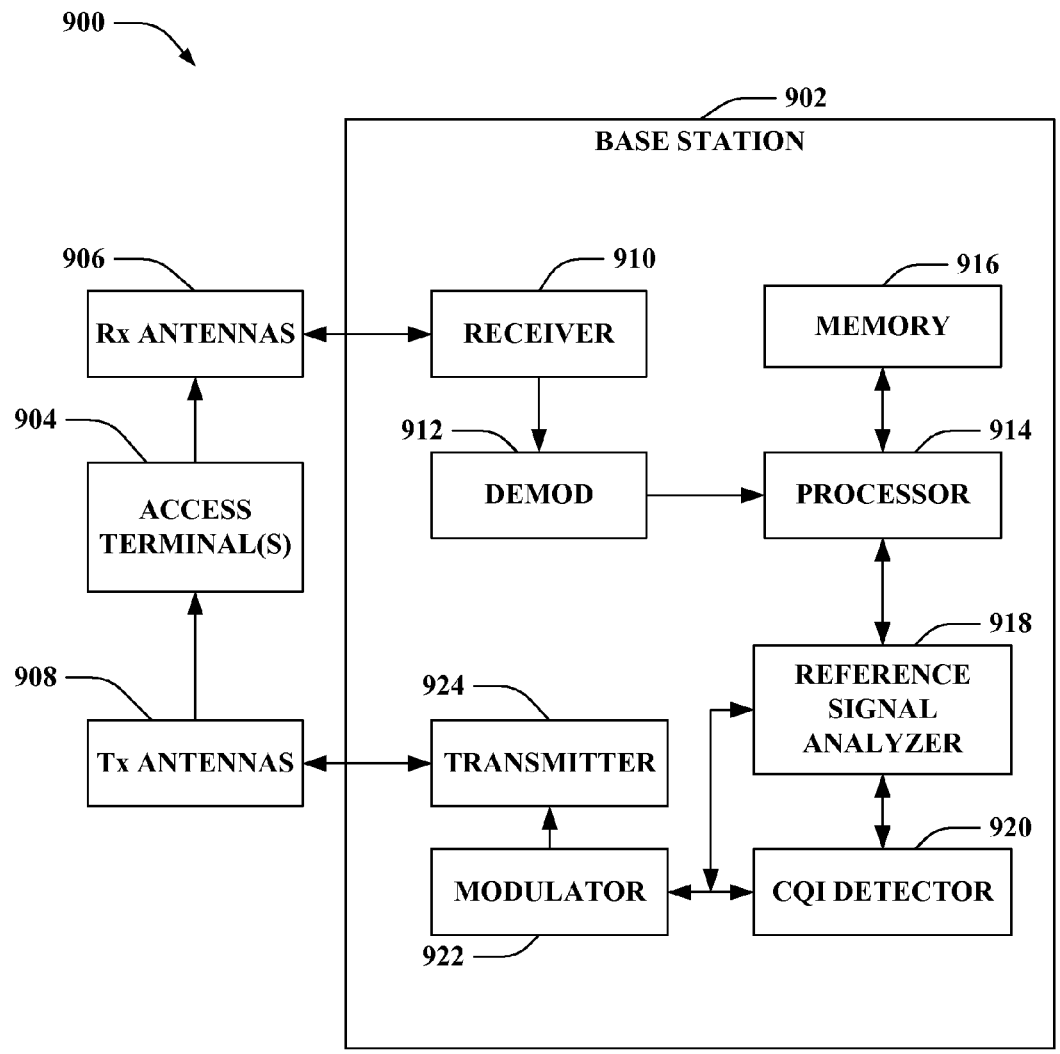
FIG. 9 is an illustration of an example system that detects DTX uplink transmissions in a wireless communication environment.

FIG. 9 is an illustration of a system 900 that detects DTX uplink transmissions in a wireless communication environment. System 900 comprises a base station 902 (e.g., access point, ... ) with a receiver 910 that receives signal(s) from one or more access terminals 904 through a plurality of receive antennas 906, and a transmitter 924 that transmits to the one or more access terminals 904 through a transmit antenna 908. Receiver 910 can receive information from receive antennas 906 and is operatively associated with a demodulator 912 that demodulates received information. Demodulated symbols are analyzed by a processor 914 that can be similar to the processor described above with regard to FIG. 8, and which is coupled to a memory 916 that stores data to be transmitted to or received from access terminal(s) 904 and/or any other suitable information related to performing the various actions and functions set forth herein. Processor 914 is further coupled to a reference signal analyzer 918 that evaluates reference signal symbols in a PUCCH subframe to detect indicator(s) incorporated therein. Moreover, base station 902 can include a CQI detector 920 that can analyze non-reference signal symbols in the same PUCCH subframe to identify CQI information. It is contemplated, for example, that a DTX indicator can be identified by reference signal analyzer 918 (e.g., carried by the reference signal symbols, ... ) or CQI detector 920 (e.g., carried by the non-reference signal symbols, ... ). Further, it is to be appreciated that reference signal analyzer 918 can be substantially similar to reference signal analyzer 304 of FIG. 3 and/or CQI detector 920 can be substantially similar to CQI detector 222 of FIG. 2. Moreover, although not shown, it is contemplated that base station 902 can include an ACK/NAK evaluator, which can be substantially similar to ACK/NAK evaluator 224 of FIG. 2, and/or a DTX identifier, which can be substantially similar to DTX identifier 226 of FIG. 2. Base station 902 can further include a modulator 922. Modulator 922 can multiplex a frame for transmission by a transmitter 924 through antennas 908 to access terminal(s) 904 in accordance with the aforementioned description. Although depicted as being separate from the processor 914, it is to be appreciated that reference signal analyzer 918, CQI detector 920, and/or modulator 922 can be part of processor 914 or a number of processors (not shown).

Figure 10:
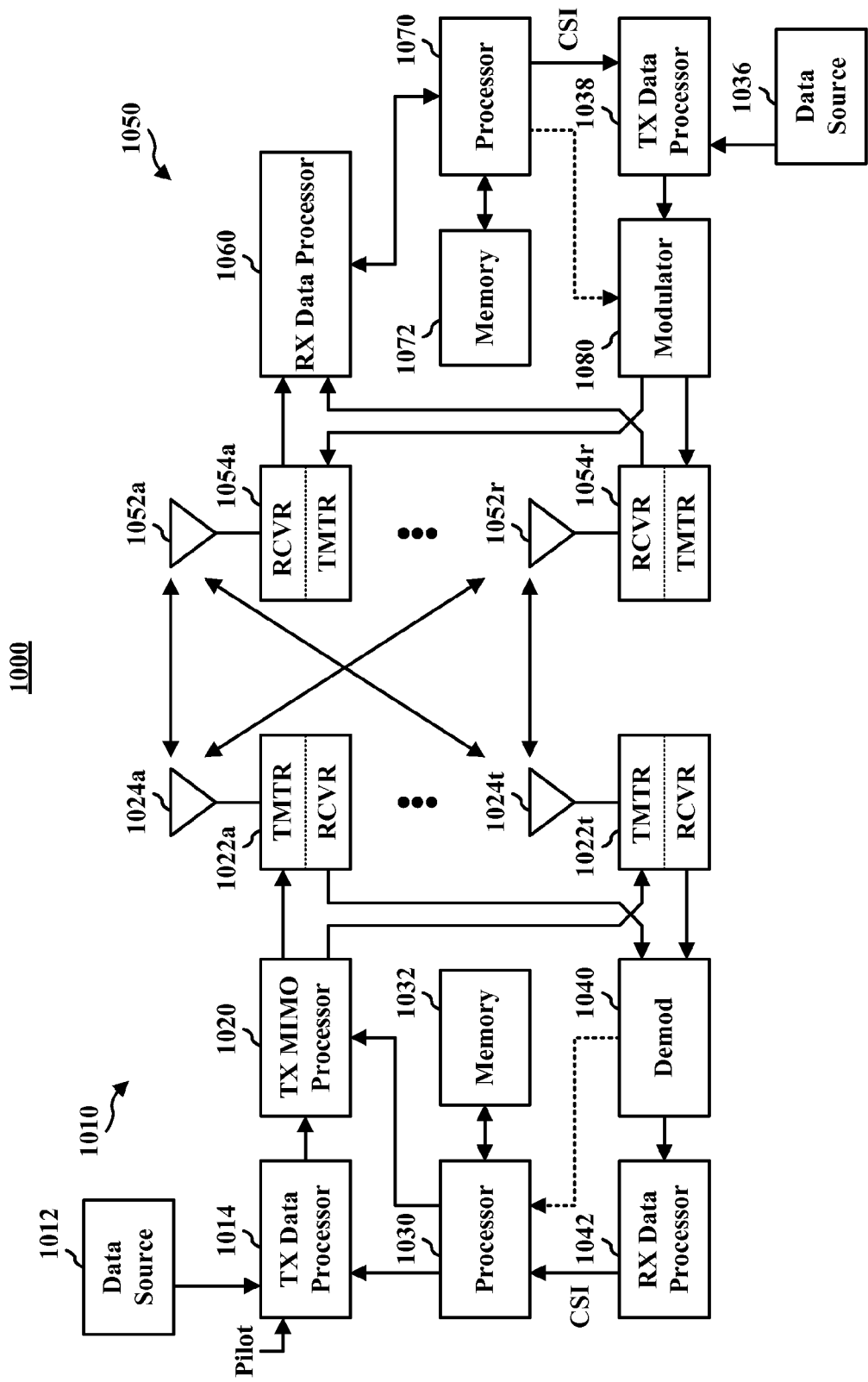
FIG. 10 is an illustration of an example wireless network environment that can be employed in conjunction with the various systems and methods described herein.

FIG. 10 shows an example wireless communication system 1000. The wireless communication system 1000 depicts one base station 1010 and one access terminal 1050 for sake of brevity. However, it is to be appreciated that system 1000 can include more than one base station and/or more than one access terminal, wherein additional base stations and/or access terminals can be substantially similar or different from example base station 1010 and access terminal 1050 described below. In addition, it is to be appreciated that base station 1010 and/or access terminal 1050 can employ the systems (FIGS. 1-4, 8-9, and 11-12) and/or methods (FIGS. 6-7) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At access terminal 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which available technology to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from access terminal 1050 are received by antennas 1024, conditioned by receivers 1022, demodulated by a demodulator 1040, and processed by a RX data processor 1042 to extract the reverse link message transmitted by access terminal 1050. Further, processor 1030 can process the extracted message to determine which precoding matrix to use for determining the beamforming weights.

Processors 1030 and 1070 can direct (e.g., control, coordinate, manage, etc.) operation at base station 1010 and access terminal 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, ...) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
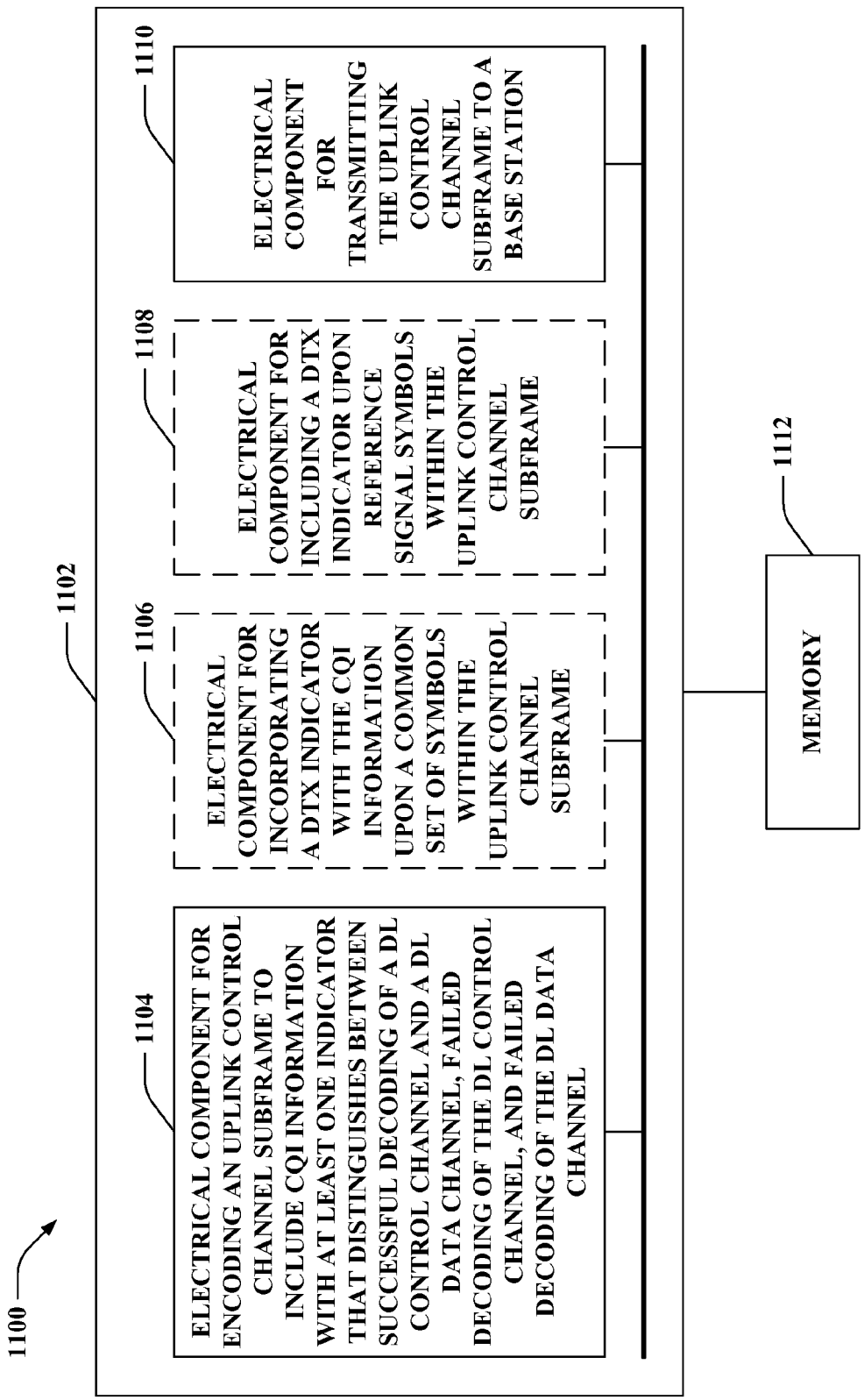
FIG. 11 is an illustration of an example system that enables signaling discontinuous transmission (DTX) with Channel Quality Indicator (CQI) information to a base station in a wireless communication environment.

With reference to FIG. 11, illustrated is a system 1100 that enables signaling discontinuous transmission (DTX) with Channel Quality Indicator (CQI) information to a base station in a wireless communication environment. For example, system 1100 can reside within an access terminal. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for encoding an uplink control channel subframe to include CQI information with at least one indicator that distinguishes between successful decoding of a downlink (DL) control channel and a downlink (DL) data channel, failed decoding of the downlink control channel, and failed decoding of the downlink data channel 1104. Further, logical grouping 1102 can optionally include an electrical component for incorporating a DTX indicator with the CQI information upon a common set of symbols within the uplink control channel subframe 1106. Moreover, logical grouping 1102 can optionally include an electrical component for including a DTX indicator upon reference signal symbols within the uplink control channel subframe 1108. Logical grouping 1102 can also include an electrical component for transmitting the uplink control channel subframe to a base station 1110. Additionally, system 1100 can include a memory 1112 that retains instructions for executing functions associated with electrical components 1104, 1106, 1108, and 1110. While shown as being external to memory 1112, it is to be understood that one or more of electrical components 1104, 1106, 1108, and 1110 can exist within memory 1112.

Figure 12:
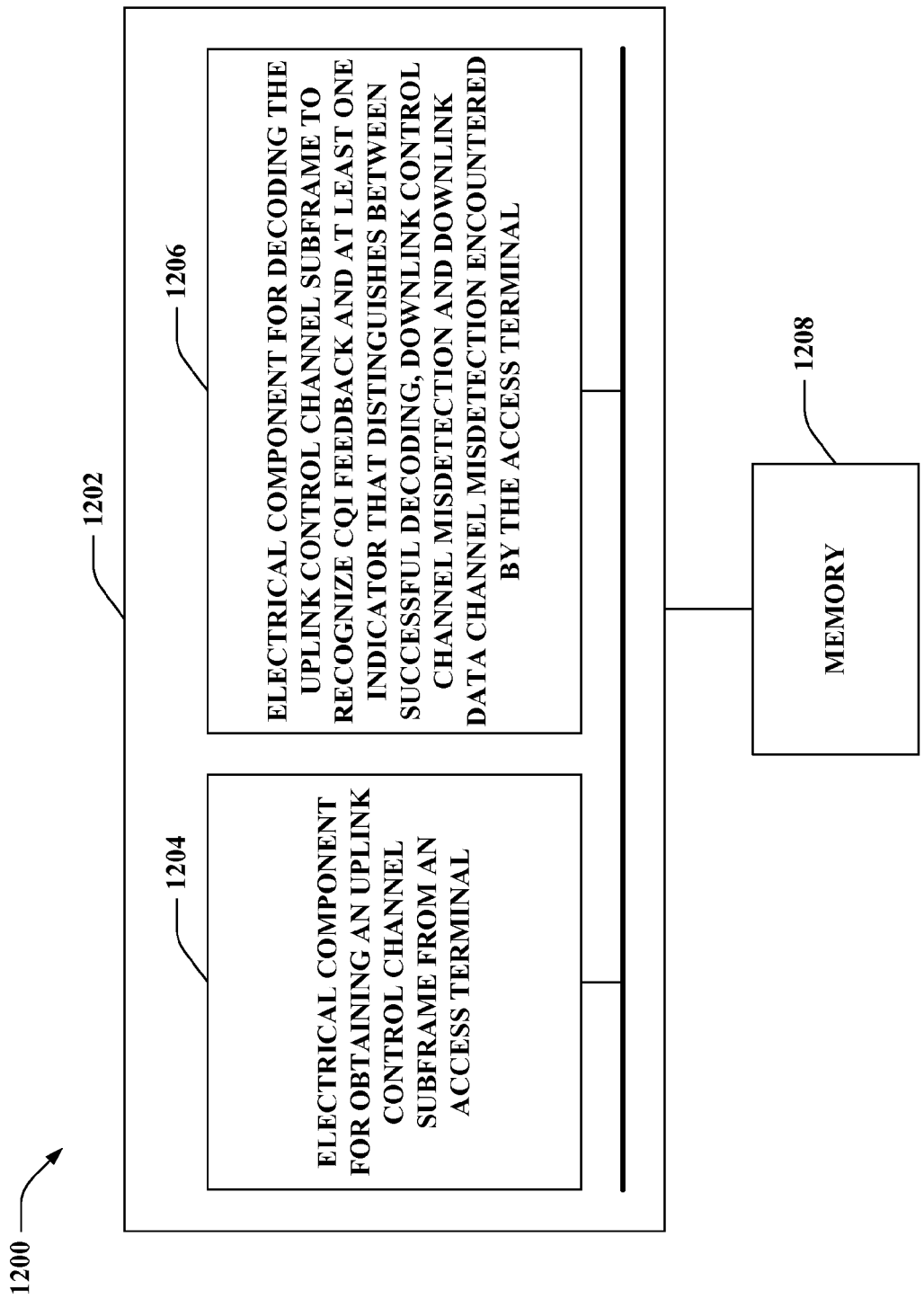
FIG. 12 is an illustration of an example system that enables detecting discontinuous transmission (DTX) signaled by an access terminal in a wireless communication environment.

With reference to FIG. 12, illustrated is a system 1200 that enables detecting discontinuous transmission (DTX) signaled by an access terminal in a wireless communication environment. For example, system 1200 can reside at least partially within a base station. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for obtaining an uplink control channel subframe from an access terminal 1204. Further, logical grouping 1202 can include an electrical component for decoding the uplink control channel subframe to recognize Channel Quality Indicator (CQI) feedback and at least one indicator that distinguishes between successful decoding, downlink control channel misdetection and downlink data channel misdetection encountered by the access terminal 1206. Additionally, system 1200 can include a memory 1208 that retains instructions for executing functions associated with electrical components 1204 and 1206. While shown as being external to memory 1208, it is to be understood that one or more of electrical components 1204 and 1206 can exist within memory 1208.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates signaling discontinuous transmission (DTX) to a base station in a wireless communication environment, comprising:
   determining whether a downlink control channel has been successfully decoded;
   encoding an uplink control channel subframe, the uplink control channel subframe including a Channel Quality Indicator (CQI) information and at least one indicator that distinguishes between successful decoding of a downlink control channel and a downlink data channel, failed decoding of the downlink control channel, and failed decoding of the downlink data channel;
   adding a transmission state bit to a set of bits that represent the CQI information, the transmission state bit providing a toggle indication between linearly adding or not adding a particular Reed-Muller (RM) basis vector based upon one of DTX operation or non-DTX operation;
   setting a value for the transmission state bit to signal one of DTX operation or non-DTX operation;
   encoding the transmission state bit and the bits representing the CQI information jointly upon non-reference signal symbols in a slot; and
   transmitting the encoded uplink control channel subframe to a base station.

2. The method of claim 1, in which the at least one indicator comprises one or more of:
   an Acknowledge (ACK) indicator or a Negative-Acknowledge (NAK) indicator corresponding to the downlink data channel in response to the downlink control channel being successfully decoded; or a DTX indicator corresponding to the downlink control channel in response to the downlink control channel being unsuccessfully decoded.

3. The method of claim 2, further comprising determining whether the downlink control channel is successfully decoded by recognizing whether an assignment corresponding to the uplink control channel sent via the downlink control channel is received and decoded.

4. The method of claim 2, further comprising: encoding reference signal symbols within a slot to include one of the DTX indicator, the ACK indicator, or the NAK indicator; and encoding non-reference signal symbols within the slot to include the CQI information.

5. The method of claim 4, further comprising: employing a first mapping for the reference signal symbols within the slot when incorporating the DTX indicator; utilizing a second mapping for the reference signal symbols within the slot when incorporating the ACK indicator; and using a third mapping for the reference signal symbols within the slot when incorporating the NAK indicator.

6. The method of claim 5, further comprising: setting a first reference signal symbol within the slot to 1 and a second reference signal symbol within the slot to j when employing the first mapping to incorporate the DTX indicator; setting the first reference signal symbol within the slot to 1 and the second reference signal symbol within the slot to -1 when utilizing the second mapping to incorporate the ACK indicator; and setting the first reference signal symbol within the slot to 1 and the second reference signal symbol within the slot to 1 when using the third mapping to incorporate the NAK indicator.

7. The method of claim 4, further comprising setting a first reference signal symbol within the slot to 1 and a second reference signal symbol within the slot to 1 when in DTX mode in connection with downlink multiple input multiple output (MIMO) operation.

8. A wireless communications apparatus, comprising:
a memory that retains instructions related to
determining whether a downlink control channel has been successfully decoded,
encoding an uplink control channel subframe, the uplink control channel subframe including a Channel Quality Indicator (CQI) information and at least one indicator that distinguishes between successful decoding of a downlink control channel and a downlink data channel, failed decoding of the downlink control channel, and failed decoding of the downlink data channel;
adding a transmission state bit to a set of bits that represent the CQI information, the transmission state bit providing a toggle indication between linearly adding or not adding a particular Reed-Muller (RM) basis vector based upon one of DTX operation or non-DTX operation;
setting a value for the transmission state bit to signal one of DTX operation or non-DTX operation;
encoding the transmission state bit and the bits representing the CQI information together upon non-reference signal symbols in a slot; and
sending the encoded uplink control channel subframe to a base station; and a processor, coupled to the memory, configured to execute the instructions retained in the memory.

9. The wireless communications apparatus of claim 8, wherein the memory further retains instructions related to determining whether the downlink control channel is successfully decoded by recognizing whether an assignment corresponding to the uplink control channel sent via the downlink control channel is received and decoded.

10. The wireless communications apparatus of claim 8, wherein the memory further retains instructions related to encoding reference signal symbols within a slot to include one of a DTX indicator, a ACK indicator, or a NAK indicator, and encoding non-reference signal symbols within the slot to include the CQI information.

11. The wireless communications apparatus of claim 10, wherein the memory further retains instructions related to employing a first mapping for the reference signal symbols within the slot when incorporating the DTX indicator, utilizing a second mapping for the reference signal symbols within the slot when incorporating the ACK indicator, and using a third mapping for the reference signal symbols within the slot when incorporating the NAK indicator.

12. The wireless communications apparatus of claim 11, wherein the memory further retains instructions related to setting a first reference signal symbol within the slot to 1 and a second reference signal symbol within the slot to j when employing the first mapping to incorporate the DTX indicator, setting the first reference signal symbol within the slot to 1 and the second reference signal symbol within the slot to -1 when utilizing the second mapping to incorporate the ACK indicator, and setting the first reference signal symbol within the slot to 1 and the second reference signal symbol within the slot to 1 when using the third mapping to incorporate the NAK indicator.

13. The wireless communications apparatus of claim 10, wherein the memory further retains instructions related to setting a first reference signal symbol within the slot to 1 and a second reference signal symbol within the slot to 1 when in DTX mode in connection with downlink multiple input multiple output (MIMO) operation.

14. A wireless communications apparatus that enables signaling discontinuous transmission (DTX) with Channel Quality Indicator (CQI) information to a base station in a wireless communication environment, comprising:
means for encoding an uplink control channel subframe to include CQI information with at least one indicator that distinguishes between successful decoding of a downlink control channel and a downlink data channel, failed decoding of the downlink control channel, and failed decoding of the downlink data channel;
means for setting a transmission state bit, the transmission state bit providing a toggle indication between linearly adding or not adding a particular Reed-Muller (RM) basis vector based upon one of DTX operation or non-DTX operation, in which the means for setting the transmission state bit,
adds the transmission state bit to a set of bits that represent the CQI information;
sets a value for the transmission state bit to signal one of DTX operation or non-DTX operation; and
encodes the transmission state bit and the bits representing the CQI information together upon non-reference signal symbols in a slot; and means for transmitting the uplink control channel subframe to a base station.

15. The wireless communications apparatus of claim 14, further comprising means for incorporating a DTX indicator with the CQI information upon a common set of symbols within the uplink control channel subframe.

16. The wireless communications apparatus of claim 15, wherein the common set of symbols includes non-reference signal symbols.

17. The wireless communications apparatus of claim 14, further comprising means for including a DTX indicator upon reference signal symbols within the uplink control channel subframe.

18. The wireless communications apparatus of claim 17, wherein the CQI information is included upon non-reference signal symbols within the uplink control channel subframe.

19. The wireless communications apparatus of claim 17, wherein a particular mapping that corresponds to the DTX indicator from a set of possible mappings is employed for the reference signal symbols.

20. The wireless communications apparatus of claim 19, wherein the particular mapping includes setting a first reference signal symbol within a slot to 1 and a second reference signal symbol within the slot to j.

21. The wireless communications apparatus of claim 19, wherein the particular mapping includes setting a first reference signal symbol within a slot to 1 and a second reference signal symbol within the slot to 1.

22. A computer program product, comprising:
a non-transitory computer-readable medium comprising:
code for encoding an uplink control channel subframe to include Channel Quality Indicator (CQI) information with at least one indicator that distinguishes between successful decoding of a downlink control channel and a downlink data channel, failed decoding of the downlink control channel, and failed decoding of the downlink data channel;
code for adding a transmission state bit to a set of bits that represent the CQI information, the transmission state bit providing a toggle indication between linearly adding or not adding a particular Reed-Muller (RM) basis vector based upon one of DTX operation or non-DTX operation;
code for setting a value for the transmission state bit to signal one of DTX operation or non-DTX operation;
code for encoding the transmission state bit and the bits representing the CQI information together upon non-reference signal symbols in a slot; and
code for transferring the uplink control channel subframe to a base station.

23. The computer program product of claim 22, wherein the computer-readable medium further comprises code for incorporating a DTX indicator with the CQI information upon a common set of symbols within the uplink control channel subframe.

24. The computer program product of claim 22, wherein the computer-readable medium further comprises code for including a DTX indicator upon reference signal symbols within the uplink control channel subframe.

25. The computer program product of claim 24, wherein a particular mapping that corresponds to the DTX indicator from a set of possible mappings is employed for the reference signal symbols.

26. The computer program product of claim 25, wherein the particular mapping includes setting a first reference signal symbol within a slot to 1 and a second reference signal symbol within the slot to j.

27. The computer program product of claim 25, wherein the particular mapping includes setting a first reference signal symbol within a slot to 1 and a second reference signal symbol within the slot to 1.

28. In a wireless communications system, an apparatus comprising:
a processor configured to:
determine whether a downlink control channel is successfully decoded by recognizing whether an assignment corresponding to an uplink control channel sent via the downlink control channel is received and decoded;
encode an uplink control channel subframe, the uplink control channel subframe including a Channel Quality Indicator (CQI) information and at least one indicator that distinguishes between successful decoding of a downlink control channel and a downlink data channel, failed decoding of the downlink control channel, and failed decoding of the downlink data channel;
add a transmission state bit to a set of bits that represent the CQI information, the transmission state bit providing a toggle indication between linearly adding or not adding a particular Reed-Muller (RM) basis vector based upon one of DTX operation or non-DTX operation;
set a value for the transmission state bit to signal one of DTX operation or non-DTX operation;
encode the transmission state bit and the bits that represent the CQI information together upon non-reference signal symbols in a slot; and
transmit the encoded uplink control channel subframe to a base station.

* * * * *